(12) United States Patent
Townsend et al.

(10) Patent No.: US 7,143,004 B2
(45) Date of Patent: Nov. 28, 2006

(54) SOLID STATE ORIENTATION SENSOR WITH 360 DEGREE MEASUREMENT CAPABILITY

(75) Inventors: Christopher P. Townsend, Shelburne, VT (US); Steven W. Arms, Williston, VT (US)

(73) Assignee: Microstrain, Inc., Williston, VT (US)

( * ) Notice: Subject to any disclaimer, the term of this patent is extended or adjusted under 35 U.S.C. 154(b) by 0 days.

(21) Appl. No.: 10/447,384

(22) Filed: May 29, 2003

(65) Prior Publication Data

US 2003/0204361 A1 Oct. 30, 2003

Related U.S. Application Data

(63) Continuation of application No. 09/457,493, filed on Dec. 8, 1999, now abandoned.

(60) Provisional application No. 60/111,523, filed on Dec. 9, 1998.

(51) Int. Cl.
*G01C 19/00* (2006.01)

(52) U.S. Cl. .................. 702/153; 702/150; 702/92; 702/95

(58) Field of Classification Search ............. 702/153, 702/150, 92, 95; 33/313, 304
See application file for complete search history.

(56) References Cited

U.S. PATENT DOCUMENTS 4,414,753 A * 11/1983 Moulin et al. ............ 33/356

5,930,741 A * 7/1999 Kramer ...................... 702/153
5,953,683 A * 9/1999 Hansen et al. ............... 702/95

OTHER PUBLICATIONS

Sears, Zemansky and Young, University Physics, Addison-Wesley, 1987, p. 14.*
Horowitz and Hill, The Art of Electronics, Cambridge University Press, 1989, p. 665 and 830.*

* cited by examiner

*Primary Examiner*—John Barlow
*Assistant Examiner*—Stephen J. Cherry
(74) *Attorney, Agent, or Firm*—Thomas N. Neiman; James Marc Leas

(57) ABSTRACT

The device is a miniature, self-contained solid state orientation sensor. The unit utilizes three magnetometers and three accelerometers to calculate pitch, roll, and yaw (compass heading) angles relative to the earth's magnetic and gravitational fields. The three orientation angles are output in digital RS232 or optional multi-drop RS485. The device can also be programmed to provide raw accelerometer and magnetometer data in true physical units. The device is capable of measuring angles from 0 to 360 degrees on the yaw axis, 0 to 360 degrees on the pitch axis, and −70 to +70 degrees on the roll axis. The yaw output is compensated for errors due to pitch and roll using embedded algorithms. Applications include fast solid state compassing, robotics, virtual reality, down-hole well drilling, and body position tracking for biomedical and multimedia applications.

2 Claims, 4 Drawing Sheets

SOLID STATE ORIENTATION SENSOR WITH 360 DEGREE MEASUREMENT CAPABILITY

This application is a continuation of U.S. patent application Ser. No. 09/457,493, filed Dec. 8, 1999, now abandoned, which claimed priority of U.S. Provisional Patent Application 60/111,523, filed Dec. 9, 1998.

BACKGROUND OF THE INVENTION

This invention relates to measurement devices and, in particular, to a solid state orientation sensor having a three hundred and sixty degree measurement capability for use in structural and biomedical applications.

Miniature orientation devices are used for a variety of structural and biomedical applications, including: measurement of structural angular displacement and orientation, computer input and pointing, virtual reality head and body tracking, camera stabilization, vehicle navigation, down hole drilling, feedback for functional electrical stimulation, and body position and inclination tracking. Sourced trackers use fixed magnetic field coils as a reference for magnetic sensors to detect position. (Raab et al., 1979) The source magnetic field coil is required to be relatively close (<10 feet) to the measurement coils. This greatly limit's these devices suitability in smart structure applications as it is often not practical to locate a source coil within this limited range. Sourceless trackers utilize earth's gravitational and magnetic field vectors, and do not limit a user's range of operation in any way.

This invention describes miniature, sourceless orientations sensor based on accelerometers and magnetometers that include analog and digital signal conditioning, embedded microprocessor, digital and analog output, and has the capability to measure pitch over a range of 360 degrees, yaw over a range of 360 degrees, and roll over a range of up to +/−90 degrees. Pitch, roll and yaw angles are computed in real time by a microprocessor located on the same board as the sensors, which eliminates the need for bulky external processing units, and facilitates networking.

The following prior art is known to the applicant:

U.S. Pat. No. 5,953,683 to Hansen et. al describes a number of devices that utilize linear accelerometers, magnetometers, and rate sensors to measure pitch roll and yaw. The device based only on accelerometers and magnetometers does not teach how to use the accelerometers to have a range of greater than +/−90 degrees of elevation or roll angles. Furthermore, the device does not utilize rate responsive adaptive filters that will be described in this text. The device also requires an initial calibration to determine the earth's magnetic field intensity however, our device does not require this because we use three axis of magnetometers and earth's total magnetic field intensity can be measured by the three magnetometers.

U.S. Pat. No. 5,373,857 to Travers et. al describes a sourceless tracker that utilizes an optical fluid based tilt sensor. This system has the disadvantage of being fluid based which leads to an undesirable settling time and cannot measure inclination angles that are greater than +/−70 degrees.

SUMMARY OF THE INVENTION

It is the object of this invention to teach a solid state orientation sensor with 360 degree measurement capability, for use in a number of different structural and medical applications, comprising primary means comprising a plurality of magnetic field measurement sensors; secondary means comprising a plurality of response accelerometers; and a microprocessor having first means for scaling sensors with calibration coefficients, and further having second means for quadrant checking for calculating the absolute angle from accelerometers.

BRIEF DESCRIPTION OF THE DRAWINGS

Further objects and features of this invention will become more apparent by reference to the following description taken in conjunction with the following figures, in which.

DETAILED DESCRIPTION OF THE INVENTION

Figure 1:
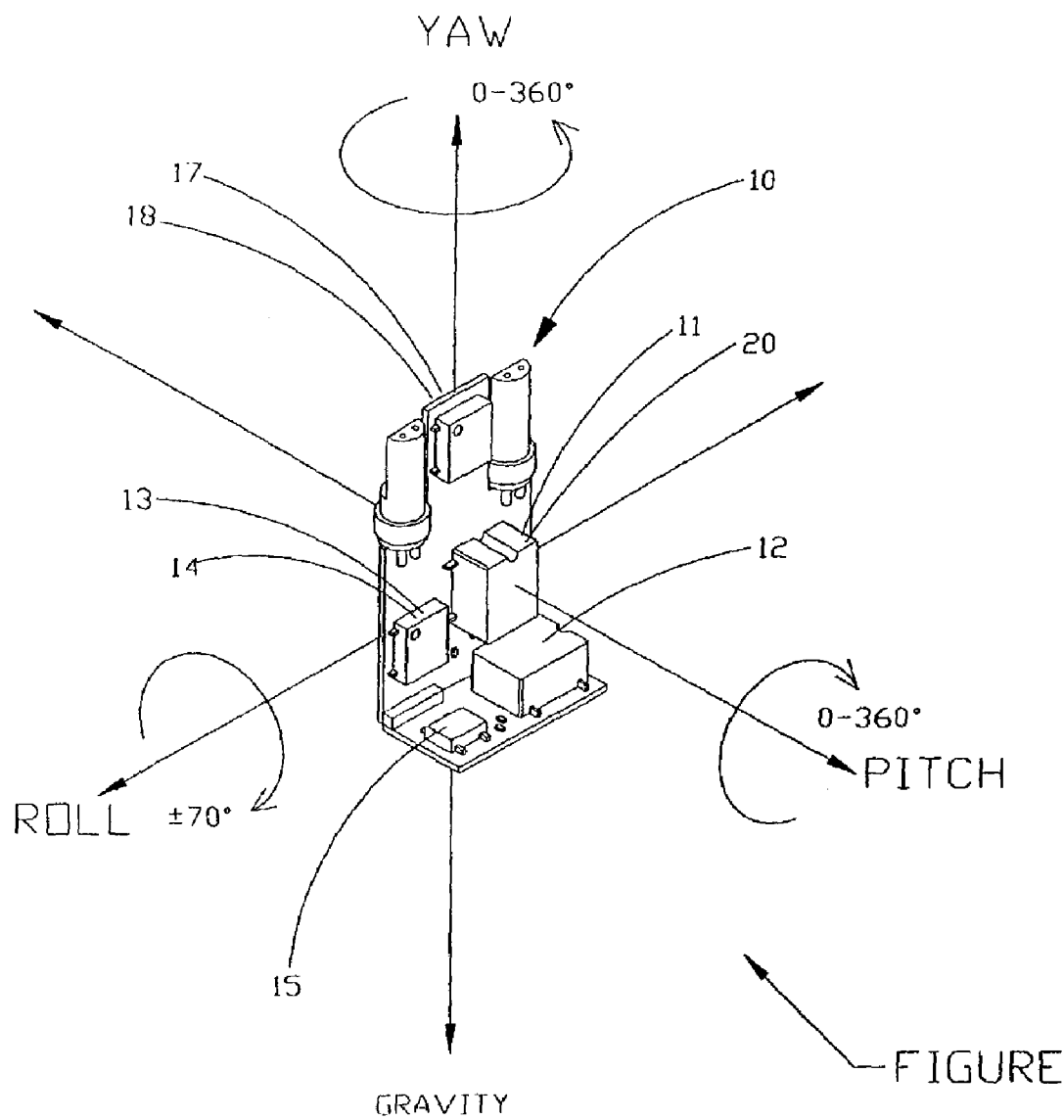
FIG. 1 is a perspective view of the solid state orientation sensor.
Figure 2:
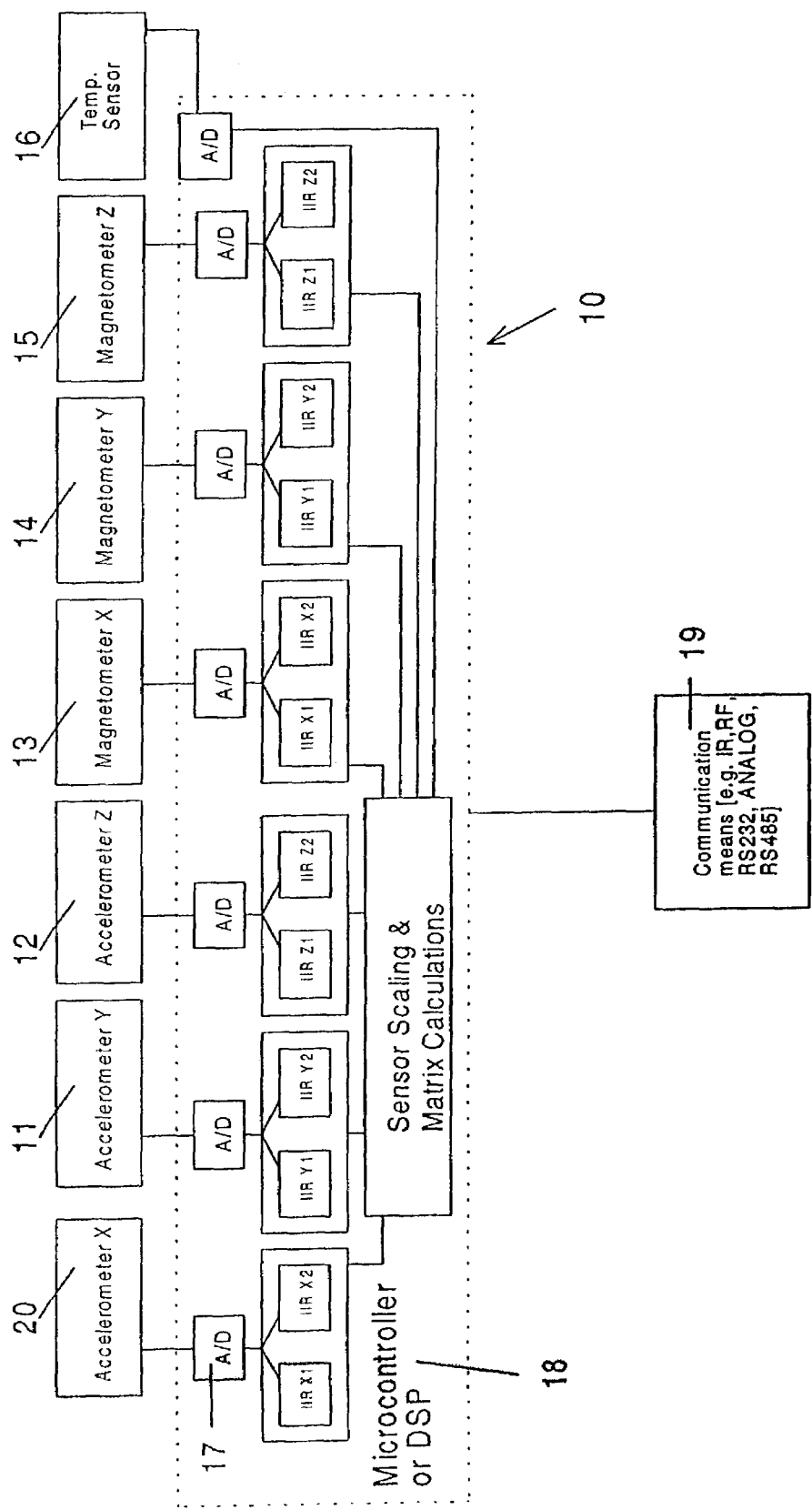
FIG. 2 is a block diagram of the operation of the orientation sensor.

This solid state orientation sensor uses three orthogonal accelerometers and three orthogonal magnetometers to measure Earth's gravitational and magnetic field vectors, from which pitch, roll, and yaw (heading) are calculated in real-time. Accelerometers provide a faster response than other sensors that are used in sourceless trackers, including electrolytic fluid (Durlack et al.,1995), thermal tilt sensors, and pendulum based inclinometers. By implementing filter algorithms that are programmable by the end user, the 3DM device response can be tuned to fit a particular application.

Analog low pass filters are implemented to help to minimize effects due to inertial inputs to the accelerometers. These analog filters dampen the effect of other inputs that have a dynamic response.

To supplement analog filtering an infinite impulse response (IIR) low pass recursive digital filter is utilized. The digital low pass filter function is described by the following equation:

$$x(n)=K*u(n)+(1-K)*x(n-1)$$

The transfer function of this filter in the digital domain using the z-transform relation can be reduced to:

$$H(z)=K/(1-(1-K)z^{-1})$$

Where K is the filter gain, which for computational reasons in this application, is always a factor of a power of two. The filter gain parameters, which are proportional to the filter cutoff frequency, are programmable from the PC by the user. Typically, use of a filter with a lower cutoff frequency will produce a measurement with fewer artifacts due to noise. The tradeoff is that there is a sacrifice in the systems dynamic response to achieve this lower noise measurement. To try to reach a balance between static vs. dynamic response, an adaptive low pass filter is implemented, and can be programmed on or off by the user. The adaptive filter works by continually calculating low pass filter readings with separate filter cutoffs on all the sensors in parallel. The software monitors the first derivative of the magnetometers to determine which filter coefficients to apply to the output data. The ramifications of this are that when the device is in a relatively static condition (or moving slowly) a more aggressive filter is applied to the data, because the first derivative of the magnetometer data is small. This results in a lower noise measurement when the device is in this mode. When the first derivative of the magnetometer is above a preset (programmable by the user) level the system reverts to a filter that has a faster response. This is useful for applications such as posture control, when a stable static measurement is important, while retaining the ability to make dynamic measurements if required.

After the sensors have been filtered, pitch and roll are calculated from the accelerometers using the following relationships.

$$a_x = (a_{xraw} - a_{xoffset}) * a_{xgain} \quad a_y = (a_{yraw} - a_{yoffset}) * a_{ygain} \quad a_z = (a_{zraw} - a_{zoffset}) * a_{zgain}$$

$$\text{Pitch} = \arctan\frac{a_x}{a_z} \quad \text{Roll} = \arctan\frac{a_y}{\sqrt{a_x^2 + a_z^2}}$$

The pitch angle can be resolved over 360 degrees by checking the signs of ax and az relative to each other and making an adjustment to the output based on the quadrant that the data is located in. After pitch and roll have been calculated the component of earth's magnetic field in the earth referenced horizontal plain must be calculated. First, the magnetic sensors are offset adjusted and scaled by coefficients that are determined from a calibration procedure.

$$m_x = (m_{xraw} - m_{xoffset}) * m_{xgain} \quad m_y = (m_{yraw} - m_{yoffset}) * m_{ygain} \quad m_z = (m_{zraw} - m_{zoffset}) * m_{zgain}$$

To project the sensor readings onto the horizontal (earth referenced) plane, the following relationships are utilized:

| | | |
|---|---|---|
| my' = my" Cos (Roll) + mz" Sin (Roll) | | Roll transformation of Y axis MR |
| my = my' | | Since my is coupled to roll only |
| mz' = mz" Cos (Roll) − my" Sin (Roll) | | Roll transformation of Z axis MR |
| mx' = mx" | | Since mx is coupled to pitch only |
| mx = mx' Cos (Pitch) − mz' Sin (Pitch) | | Pitch transformation of X axis MR |

Once this has been completed Yaw (compass heading) can be calculated from the following relationship:

$$\text{Yaw} = \arctan\frac{m_x}{m_y}$$

Figure 3:
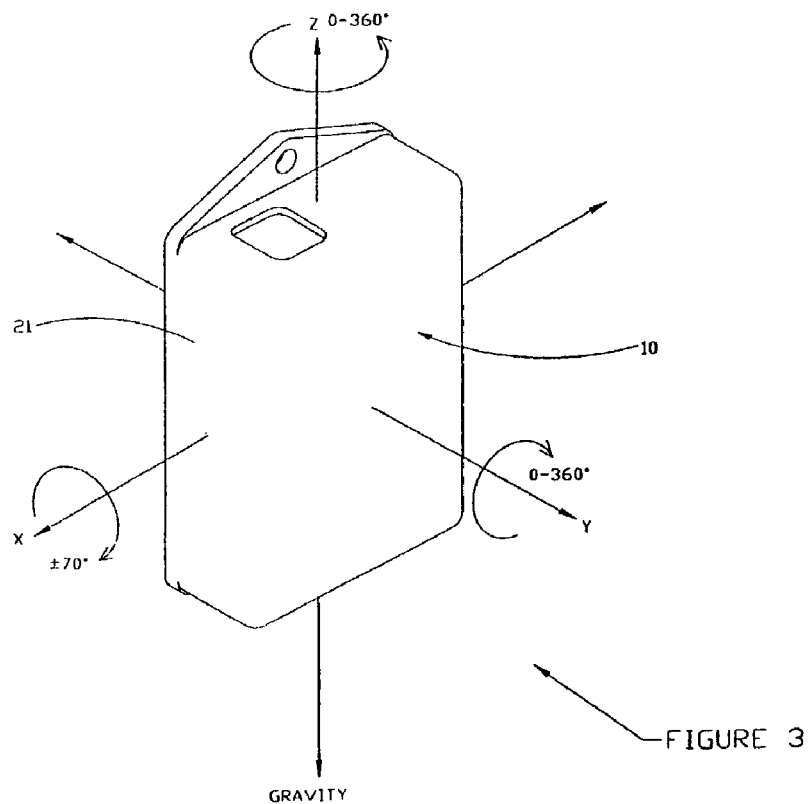
FIG. 3 is a perspective view showing the operational ranges of the solid state orientation sensor.
Figure 4:
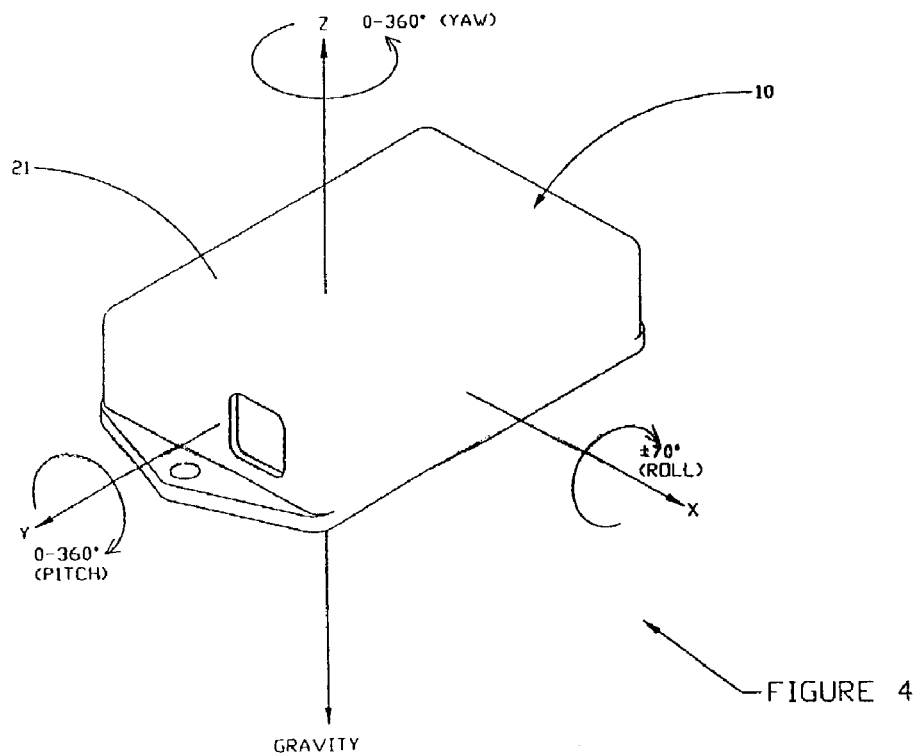
FIG. 4 is a perspective view showing the operational ranges of the solid state orientation sensor.
Figure 5:
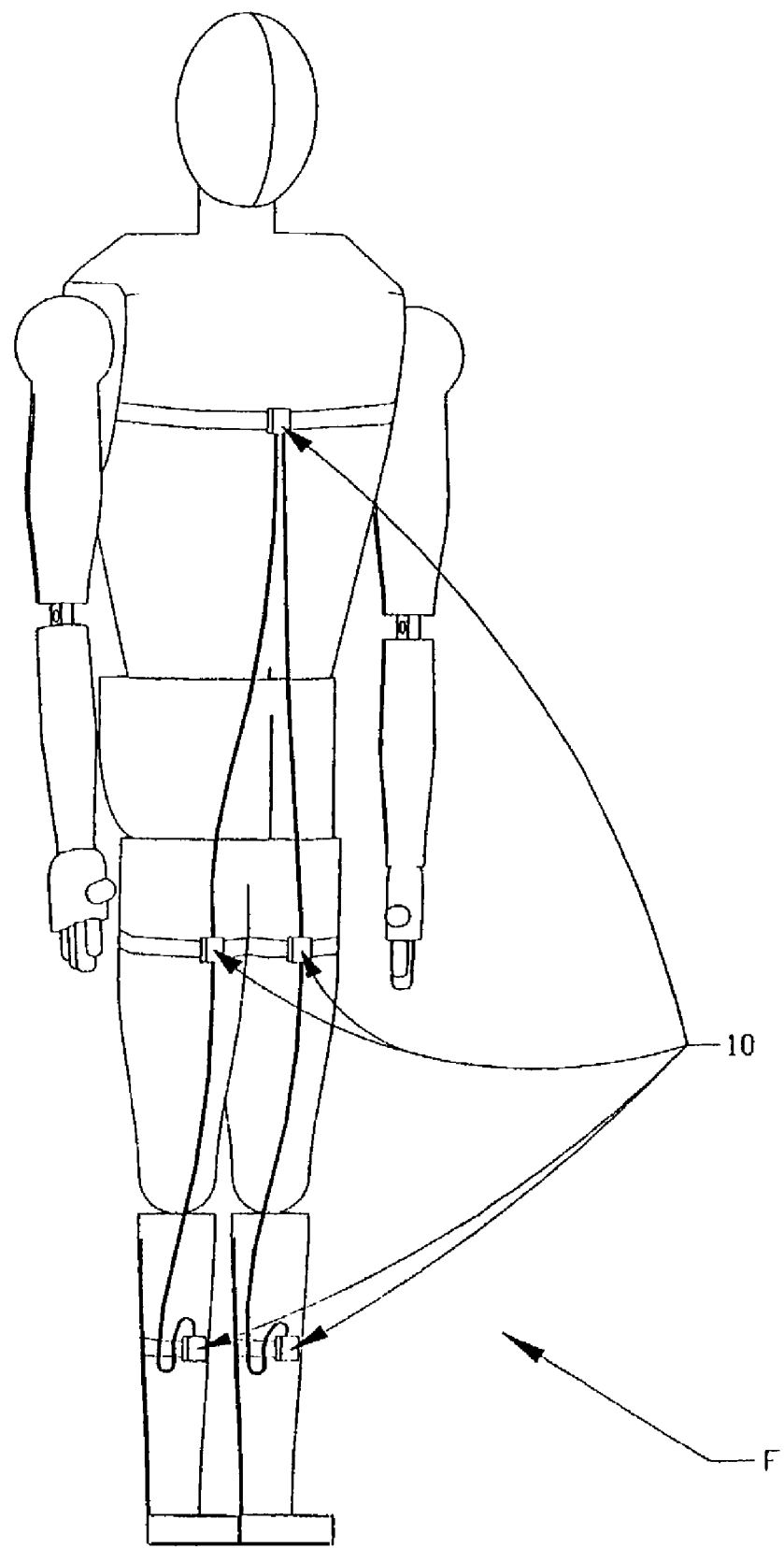
FIG. 5 is a perspective view of a plurality of solid state orientation sensors in position on the human torso.

A quadrant check based upon the sign of mx and my will yield linear result over 360 degrees of measurement range. It is also desirable to increase the range on all axes to be able to use the device to measure orientations over 360 degrees on all axes. This can be accomplished by using the accelerometers to measure angular position relative to gravity and than determining which sensors to use to calculate angle over the maximum possible range. For example, in normal mode (FIG. 1) the device will measure 360 degrees around the Z axis (Yaw), 360 degrees around the Y axis (Pitch) and +/−70 degrees around the X axis (Roll). However, if the device is positioned as in FIG. 3, it is out of range (because roll has exceeded +/−70 degrees) unless we redefine the sensors that are used in the above equations. If we redefine our axes convention, than the device can be used in this orientation. Note that in FIG. 4 we have redefined our axes, which allows us to measure in this orientation.

With reference to the Figures, the first embodiment of the solid state orientation sensor 10 includes three linear accelerometers (x 20, y 11, z, 12) oriented with their sensitive measuring axes located at ninety degrees relative to each other. The solid state orientation sensor 10 has a protective housing 21 for protecting the circuitry. Three magnetic sensors (x 13, y 14 and z 15) are also included arranged such that their sensitive measuring axes are at ninety degrees oriented relative to each other. An optional temperature sensor 16 can be used for temperature compensation of the other sensors, if required for the application. The outputs of each sensor are amplified and filtered by anti-aliasing filters prior to being routed to an analog to digital (A/D) converter 17. The digital data from the A/D converter is then scaled by offsets and scale factors for each sensor by the microprocessor or digital signal processor 18. The microprocessor than calculates the three orientation angles from the sensor data, as described in the description of the invention. Once the angles are calculated the output of the system is provided in the analog (via a d/a converter), and/or digital unit 19 (such as RS232, RS485, Controller Area Network or Transistor Transistor Logic). Digital networking means allows for multiple devices to be wired together on a single bus, which is useful for applications such as posture monitoring.

While we have described our invention in connection with specific embodiments thereof, it is clearly to be understood that his is done only by way of example and not as a limitation to the scope of my invention as set forth in the objects and in the appended claims.

We claim:
1. A solid state orientation sensor, comprising:
   a plurality of solid state magnetic field sensors;
   a plurality of solid state accelerometers;
   a microprocessor that includes a programmable digital filter, said microprocessor capable of using data from said magnetic field sensors and from said accelerometers to calculate compass heading over 360 degrees and pitch over 360 degrees wherein said digital filter is used to minimize error in data from said accelerometers caused by inertial inputs to said accelerometers, wherein said programmable digital filter is adaptive to data from said magnetic field sensors and from said accelerometers.

2. An orientation sensor as recited in claim 1, wherein filter cutoff of said programmable digital filter is programmable.

* * * * *